(12) United States Patent
Dunn et al.

(10) Patent No.: US 8,111,913 B2
(45) Date of Patent: Feb. 7, 2012

(54) COUNTERMEASURES AGAINST ORIGINAL BACKGROUND RETRIEVAL

(75) Inventors: Gregory J. Dunn, Arlington Heights, IL (US); Boaz J. Super, Westchester, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 812 days.

(21) Appl. No.: 12/212,381

(22) Filed: Sep. 17, 2008

(65) Prior Publication Data

US 2010/0067782 A1 Mar. 18, 2010

(51) Int. Cl.
*G06K 9/00* (2006.01)
(52) U.S. Cl. ........................................................ 382/162
(58) Field of Classification Search .................. 382/162, 382/164, 173, 199, 282; 345/632
See application file for complete search history.

(56) References Cited

U.S. PATENT DOCUMENTS

| 2007/0165966 A1 | 7/2007 | Weiss et al. |
| 2008/0122858 A1 | 5/2008 | Wilensky |

FOREIGN PATENT DOCUMENTS

JP 2006025448 A1 1/2006

OTHER PUBLICATIONS

PCT Search Report Dated Feb. 24, 2010.

Rubin, et al. "Real-Time Background Cut", Weizmann Institute of Science; Jul. 5, 2006; 126 Pages.
Gharai, et al. "Large Scale Video Conferencing: A Digital Amphitheater", USC Information Sciences Institute, Mar. 1, 2002.
Kolmogorov, et al. "Bi-Layer Segmentation of Binocular Stereo Video", Microsoft Research Ltd, Cambridge, UK, In Proc. IEEE Intl. Conf. on Computer Vision and Pattern Recognition, San Diego, 2005.
Richard J. Radke, Srinivas Andra, Omar Al-Kofahi, and Badrinath Roysam, "Image Change Detection Algorithms: A Systematic Survey," IEEE Transactions on Image Processing, vol. 14, No. 3, Mar. 2005.
Weiming Hu, Tieniu Tan, Liang Wang, and Steve Maybank, "A Survey on Visual Surveillance of Object Motion and Behaviors," IEEE Transactions on Systems, Man, and Cybernetics—Part C: Applications and Reviews, vol. 34, No. 3, Aug. 2004.
Chris Stauffer and W. Eric L. Grimson, "Learning Patterns of Activity Using Real-Time Tracking," IEEE Transactions on Pattern Analysis and Machine Intelligence, vol. 22, No. 8, Aug. 2000.

*Primary Examiner* — Duy M Dang
(74) *Attorney, Agent, or Firm* — Anthony P. Curtis; Daniel R. Bestor (57) ABSTRACT

A device and method of modifying an image containing a foreground and an original or substitute background are disclosed. Boundary pixels contain only the original background or the original background and the foreground. The original background is replaced by a predetermined or random color or by a color corresponding to the substitute background. The entire boundary pixel can be replaced by the replacement color. Alternatively, the ratio of the foreground to the original background can be estimated from the neighboring pixels and only the original background replaced by the replacement color. Once some or all of the boundary pixels are replaced, the image can be transmitted or otherwise transferred to other devices or viewers. Some or all of the images in a video can be modified.

21 Claims, 8 Drawing Sheets

| 0 | 0 | 893 |
|---|---|---|
| 627 | 0 | 0 |
| | | 0 |

FIG. 7A

| 847 | 881 | 893 |
|---|---|---|
| 627 | 893 | 807 |
| | | 123 |

COUNTERMEASURES AGAINST ORIGINAL BACKGROUND RETRIEVAL

TECHNICAL FIELD

The present application relates to communication devices. In particular, the application relates to protecting an original background of an image against recovery after a new background has been substituted for the original background.

BACKGROUND

Recently, the number of communication devices that are able to provide videoconferencing capabilities with extended functionality has increased dramatically and their ease of use has improved dramatically. Typical communication devices that are used in videoconferencing include, for example, cellular and smart phones, personal data assistants (PDAs), and laptop and desktop computers. One extended function which has become increasingly available due to the ever-growing processing power of the devices, and has consequently experienced increased popularity, is ability to substitute a different, selectable background in place of the original background. This feature is not limited to real-time communication such as videoconferencing; in the recent explosion of video postings to internet sites, some videos may use background substitution to form a composite image containing the original foreground and the substitute background.

There are different reasons for employing background substitution. These reasons can include, for example, purely entertainment or humorous purposes, or confidentiality purposes. The latter reason includes hiding materials that are deemed inappropriate for viewing by the particular target audience or unauthorized viewers. Such materials may include confidential business or personal materials for which dissemination would be inappropriate or identity-related materials that would permit a subject who might otherwise wish to remain anonymous to be identified or associated with an employer or specific location and thus risk embarrassment, reprisal, harassment, or criminal exploitation such as identity theft, targeted burglary, or stalking.

In certain circumstances the original background can be recovered or reproduced despite its replacement with a substitute background, leading to the above problems. It is desirable to be able to provide the ability to replace the original background with a substitute background while minimizing the likelihood of the original background being recovered or reproduced.

BRIEF DESCRIPTION OF THE DRAWINGS

Embodiments will now be described by way of example with reference to the accompanying drawings, in which.

DETAILED DESCRIPTION

A method of replacing boundary pixels in an image is disclosed. The boundary pixels can be formed from either only the original background color or a combination of the original background and the foreground colors. Either the entire boundary pixel is replaced by a pixel of a set color or only the original background color in the boundary pixel is replaced by a color determined by the user or by a color independent of the original background color in the boundary pixel. In the latter case, the original background color and the percentage of the foreground and original background is estimated in the boundary pixel, e.g., from neighboring pixels containing the foreground and/or background. The original background color is subtracted and a color corresponding to a substitute or original background, the foreground, or a set color replaces the original background color. At least a substantial percentage of the boundary pixels are reformulated to eliminate the original background color and the boundary pixels are replaced with the recolored boundary pixels. The boundary pixels of static images or in the images of a video can be replaced. Once the boundary pixels are replaced, the image can be transmitted or otherwise transferred to other devices and/or to viewers.

Figure 1:
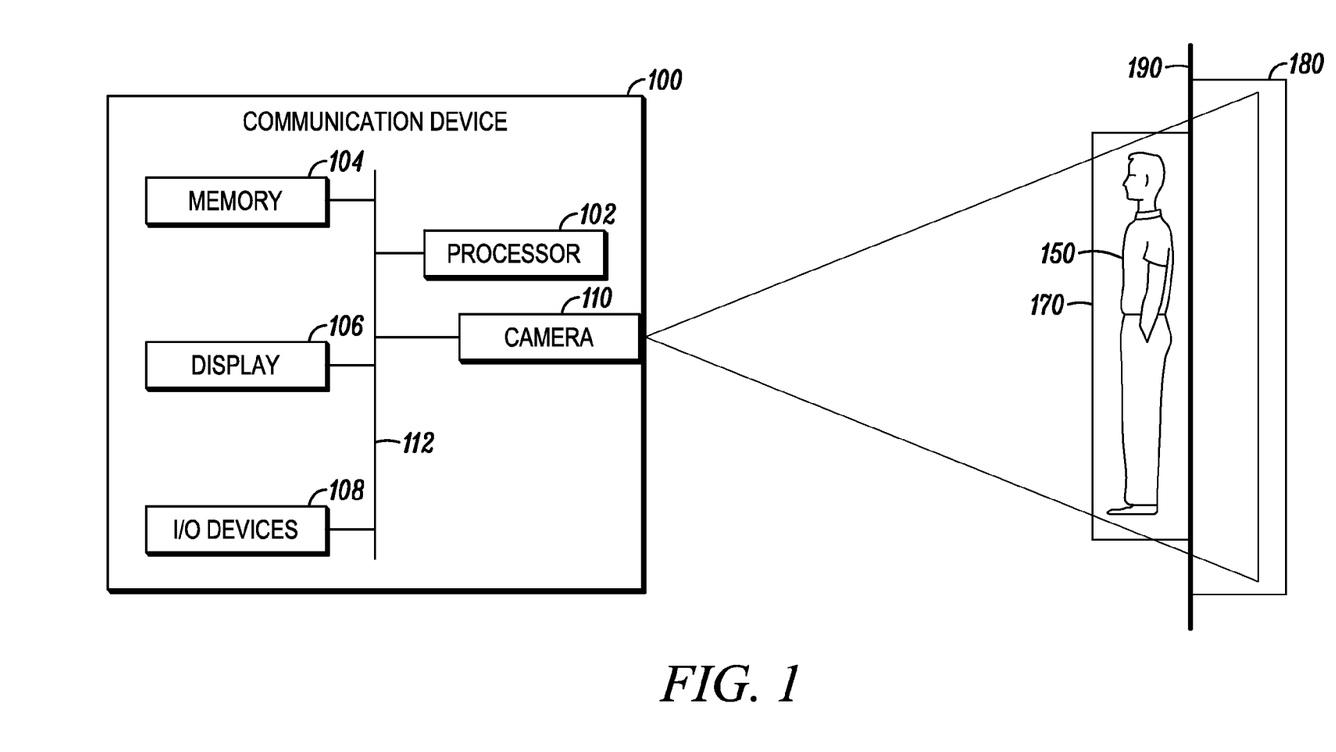
FIG. 1 illustrates image capture using a device according to one embodiment.

A typical communication device is shown in FIG. 1. The device 100 contains components and circuitry that are known in the art, only some of which are labeled and identified herein for convenience. The device 100 has a processor 102, a memory 104, a display 106, I/O devices 108 (such as a keyboard, a joystick, a touch screen, a microphone, soft (software defined) keys, hard keys, an antenna, or a speaker), a sensor (not shown) such as an accelerometer or gyroscope, and one or more cameras 110 that are connected via a bus 112. Such a device can be, for example, a cellular or smart phone, a personal data assistant (PDA), a laptop computer, or a desktop computer. Other circuitry in the device 100, such as transmit/receive circuitry and input/output circuitry, is not shown for convenience.

The processor 102 may be a conventional processor that is commercially available from Intel, AMD, Freescale, and Cyrix, among others. Similarly, the memory 104 may be a conventional memory that is commercially available. The memory 104 may include random-access memory (RAM) and/or read-only memory (ROM) that contain, for example, computer-accessible media. The processor 102 executes computer programs stored on the computer-accessible media. As above, such components are known in the art, as are other components of the device 100, and thus further description will be avoided herein.

Similarly, the device 100 can be communicatively connected to the Internet via a wired or wireless connection in a manner known in the art. Wired connections can be provided using, for example, a modem or Ethernet or similar network card connected to a local-area network (LAN) or a wide-area network (WAN) that itself is connected to the Internet via, for example, a T1 line. Wireless connections can be provided using WiFi or some other connection. The device 100 may operate on operating systems such as Microsoft Windows®, Apple MacOS®, Linux®, and UNIX®, among others. Examples are not limited to any particular operating system, however, and the construction and use of such operating systems, as above, are known within the art and thus further description will be avoided herein.

The camera 110 can be disposed at any convenient location in the device 100. The camera 110, when actuated using the I/O devices 108, is capable of taking an image of a scene containing a foreground 170 separated from a background 180 by a virtual boundary 190. The foreground 170 contains a subject 150. The position of the virtual boundary 190 may be set manually using an input of the device 100 (e.g., a wheel, up/down buttons, etc.) or automatically by the processor 102. The image is processed, either by the processor 102 in the device 100 or in an external device or system (not shown) connected to the device 100 through a wired or wireless connection (not shown), to form the composite image.

The substitute background may be selected from one or more backgrounds stored on the device in the memory 104 and/or stored remotely (i.e., in a device other than that taking the image). Similarly, processing to substitute the background and produce the composite image containing the original foreground and the substitute background may be performed on the device and/or remotely.

The substitute background is selectable from a library of still images or videos. The substitute background can include well known locations, such as the Statue of Liberty, the Grand Canyon, the Eiffel Tower, the Great Wall of China, or the US presidential office. Other images or videos can be created specially by the user or others such as indoor or outdoor scenes (e.g., a favorite location, a tropical island, a forest, or a concert stage), more fanciful locations such as outer space, underwater, underground, or cartoon locations, etc, artistic works, or visually presented information.

The background substitution can be activated by the user while the user communicates visually and/or audibly (e.g., during teleconferencing) and/or textually or prior to the communication. The manner in which the substitute background is selected can vary in a number of different ways. In one example, the user actuates an I/O device 108 on the device 100 to show one or more backgrounds. The backgrounds can be displayed individually or in groups on the display 106. A list of available backgrounds can also be displayed. If a single background is displayed, it can be selected by actuating an input (e.g. a soft or hard key, wheel, etc.). In this case, the same input can be used to select different backgrounds depending on the particular background displayed when the input is actuated. If multiple backgrounds are displayed, different inputs can correspond to selection of the different backgrounds. A user input such as a wheel may be used to scroll through displays of the one or more backgrounds. The background can be selected either prior to or after communication with other users is established.

In one method of providing background substitution, images with and without a subject being present are taken, in any order, using a device containing one or more cameras, and compared to determine which portions of images with a subject are background. The determination of background portions may be performed using, for example, methods referenced in Richard J. Radke, Srinivas Andra, Omar Al-Kofahi, and Badrinath Roysam, "Image Change Detection Algorithms: A Systematic Survey," *IEEE Transactions on Image Processing*, Vol. 14, No. 3, March 2005. Another background, selected by the user, is substituted in place of the background portions. Unfortunately, this technique may also replace foreground portions that do not move. Also, background portions that experience significant changes, for example, due to movement or illumination changes, may be retained instead of replaced in the modified image.

In another technique, an image is obtained with the subject present and in which each pixel contains depth information, i.e., pixel values that represent distances of different parts of the scene. Such an image contains information that can be used to separate the background from the foreground without having to take images without the subject being present. The depth information is provided by the combination of signals from the different cameras using methods well-known to those skilled in the art. Differences in colors between the foreground and background may be also be used to separate the background from the foreground. As before, another background, selected by the user, is substituted in place of the background.

Figure 2:
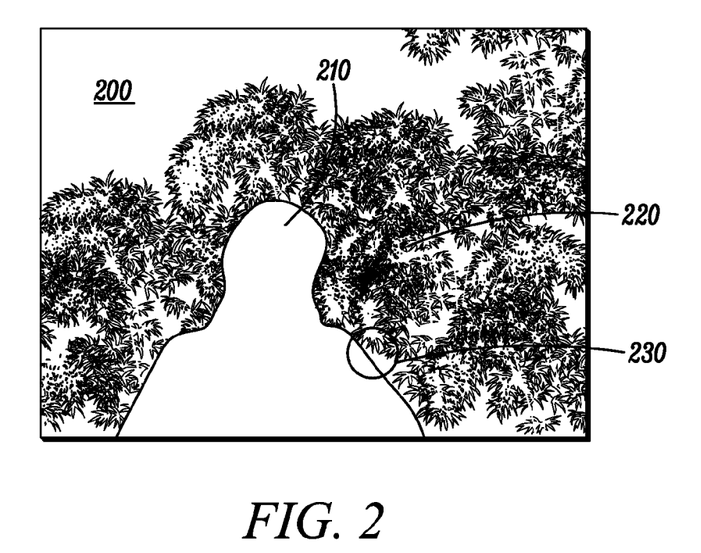
FIG. 2 illustrates an image with substitute background according to one embodiment.

One example of a composite image is shown in FIG. 2. The image 200 has a foreground 210 and a substitute background 220. In place of the original background (an office), the substitute background 220 of the image FIG. 2 is an outdoor scene replete with trees, blue sky, etc. The image 200 also contains boundary pixels 230 that form the boundary between the foreground 210 and the substitute background 220. However, the algorithms that determine where the boundary is located are not perfect, causing errors to be made in the positioning of the boundary by the processor and system running the algorithm. This can lead to one or more pixels of the original background adjacent to the actual boundary being retained instead of replaced.

Figure 3:
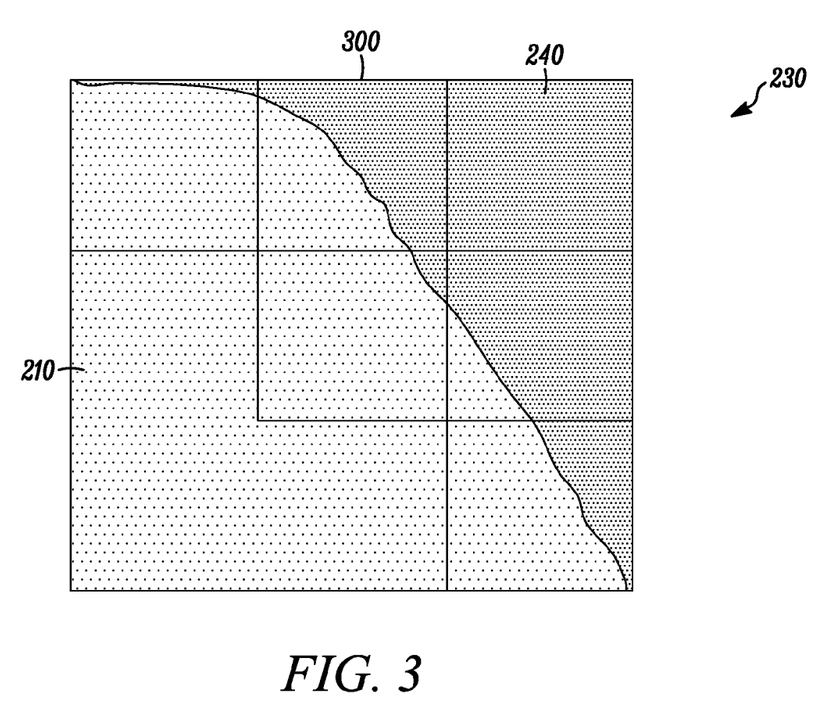
FIG. 3 shows boundary pixels in the image of FIG. 2.

The problem of boundary positioning is, however, only the most obvious example of the original background information still being inadvertently available. A more subtle manner in which the original background is available is the boundary pixels that straddle the foreground and the background, as shown in the enlargement of the composite image 200 of FIG. 3. The transition area 300 of the composite image 200 shown contains a set of the boundary pixels 230. Each of the boundary pixels 230 contains color elements from both the foreground 210 and the original background 240 as shown by the different shaded regions in FIG. 3. Note that FIG. 3 illustrates the proportions of the colors that are present in each boundary pixel 230 as in practice each boundary pixel 230 provides only a single scalar or vector color (which may be different from the color of a nearest-neighbor boundary pixel 230) whose value varies depending on the percentage of the various colors present in the corresponding area of the original pixel. Thus, although the original background color 240 in the boundary pixel 230 may be imperceptible to the eye, it is nonetheless encoded in the pixel color value. This means that, although the background may be substituted outside of the boundary, color data from the original background remains present in the boundary pixels 230.

Using a different algorithm, information about the original background color of a boundary pixel can be obtained in one example by processing the color of a boundary pixel in the composite image and the color or colors of a foreground pixel or pixels, respectively, in the composite image. For example, let u represent the color of the boundary pixel in the composite image and let w represent an estimated pure foreground color at the boundary pixel in the composite image; w may be determined by processing the color or colors of a foreground pixel or pixels, respectively, in the composite image near to the boundary pixel. One technique for determining w is to calculate a weighted sum of the colors of foreground pixels near the boundary pixel, in which the weights are inversely related to the respective distances between foreground pixels and boundary pixel. It will be understood by those skilled in the art that there are many other ways to estimate w, and also that u and w and combinations of u and w may be scalar or vector quantities. For example, u and w and combinations of u and w may be three-dimensional vectors representing amount of red, amount of green, and amount of blue at a pixel. Another vector v may be determined by subtracting w from u. The vector v, positioned at w, defines a ray R through w in the direction of the original background color, b. The original background color, b, lies along the ray R. It will be understood by those skilled in the art that the background color b may not lie exactly on the ray R, due to noise, variability in the estimation of w, and other factors. The ray R encodes information about the possible or likely values of b.

Continuing this example, an estimate of b can be determined by selecting a point on R according to some rule. One example rule is to select as the value of b the point w+2v. It will be understood by those skilled in the art that other rules can be used; for example, a rule based on assumed or known probability distributions of the likely location of b relative to u and w.

Continuing this example further, improved estimates of b can be determined by combining information from multiple pixels or from multiple composite images. For example, neighboring boundary pixels often have similar original background colors, and this property can be used to enforce a constraint that neighboring estimates of original background colors be similar to each other. It will be understood by those skilled in the art that this constraint can be selectively applied in some or all regions of the composite image and that the strength of the constraint can be varied. For another example, a spatial location in a video may be a boundary pixel in more than one of the sequence of composite images that forms the video. Denote by R1 and R2 the rays, determined as above, of the corresponding boundary pixel of two composite images of the video taken at times t1 and t2, respectively. If the color of the original boundary pixel is substantially the same at times t1 and t2, and if also R1 and R2 are not the same ray, then R1 and R2 together may encode more information about the value of b than either R1 or R2 alone. For example, an improved estimate of b may be obtained by averaging the individual estimates of b determined from R1 or R2 individually.

Methods for determining a foreground object in an image or video may be used to determine the foreground of the composite image. Example methods for determining a foreground object include but are not limited to manual selection by a user; motion-based segmentation, such as motion-segmentation methods referenced in Weiming Hu, Tieniu Tan, Liang Wang, and Steve Maybank, "A Survey on Visual Surveillance of Object Motion and Behaviors," *IEEE Transactions on Systems, Man, and Cybernetics—Part C: Applications and Reviews*, Vol. 34, No. 3, August 2004; and background learning, such as the method described in Chris Stauffer and W. Eric L. Grimson, "Learning Patterns of Activity Using Real-Time Tracking," *IEEE Transactions on Pattern Analysis and Machine Intelligence*, Vol. 22, No. 8, August 2000. Note that each of the references cited herein is incorporated in its entirety. It will be understood by those skilled in the art how to determine the boundary pixels of the foreground; for example, boundary pixels may be determined by searching for foreground pixels that are adjacent to non-foreground pixels.

Figure 4:
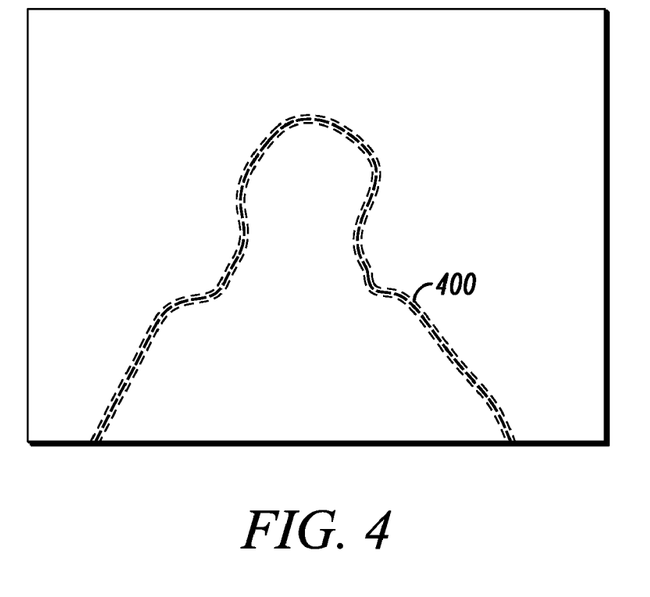
FIG. 4 shows the original background from the boundary pixels of FIG. 2.
Figure 5:
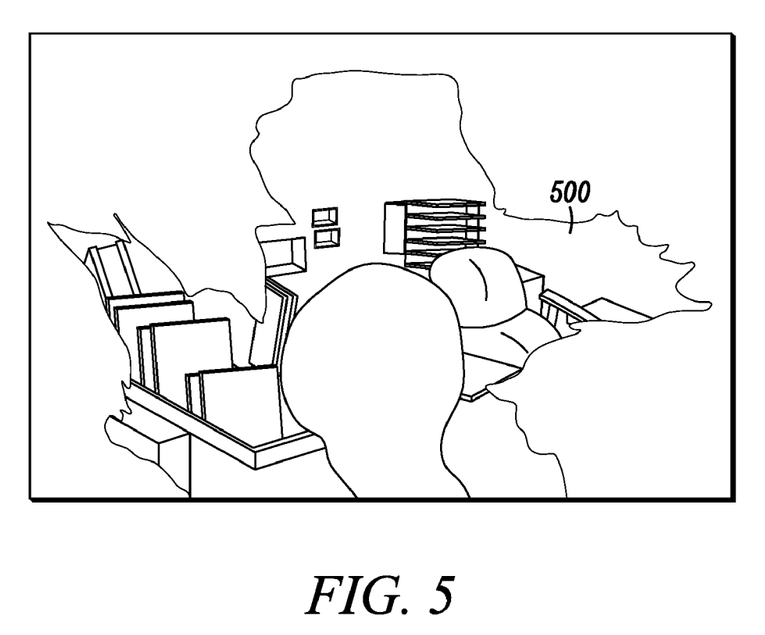
FIG. 5 shows the original background reconstructed from the boundary pixels of a video or sequence of multiple images of FIG. 2.

This remains a relatively minor problem for a static image, as recovering the original background color in the boundary pixels of a static image yields only an outline 400 as shown in FIG. 4. However, even a short video contains several thousand still images, in each of which the foreground may be slightly different as the subject moves. In fact, over the course of the video head movements, gestures, and other physical actions of the subject may cover a substantial portion of the overall frame. If information about the original background color of boundary pixels from each individual image (each yielding an outline such as that shown in FIG. 4) are aggregated, the recovered original background colors in the boundary pixels can reveal a corresponding substantial portion of the original background 500 as illustrated in FIG. 5. Note that FIGS. 4 and 5 are merely shown for illustration and are not actual sample outputs.

Figure 6A:
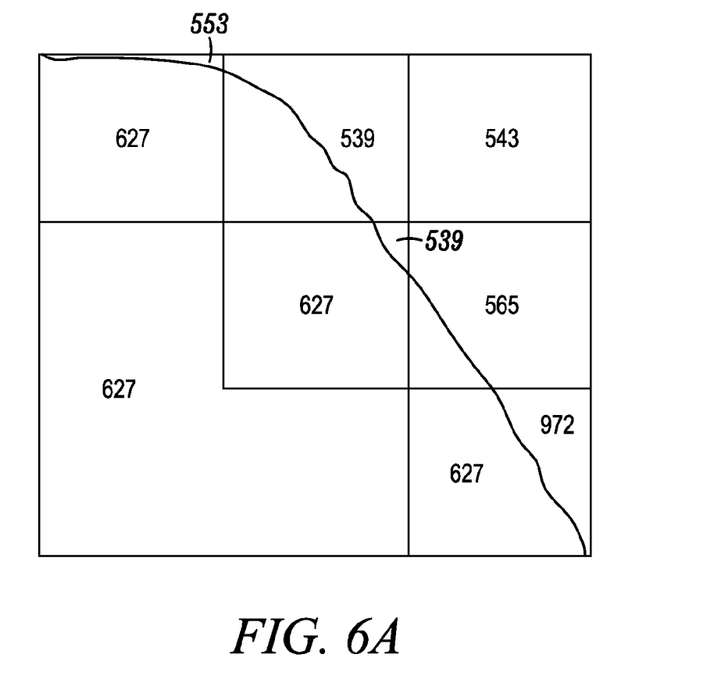
FIGS. 6A and 6B depict a numerical example of colors of the boundary pixels of FIG. 2.
Figure 6B:
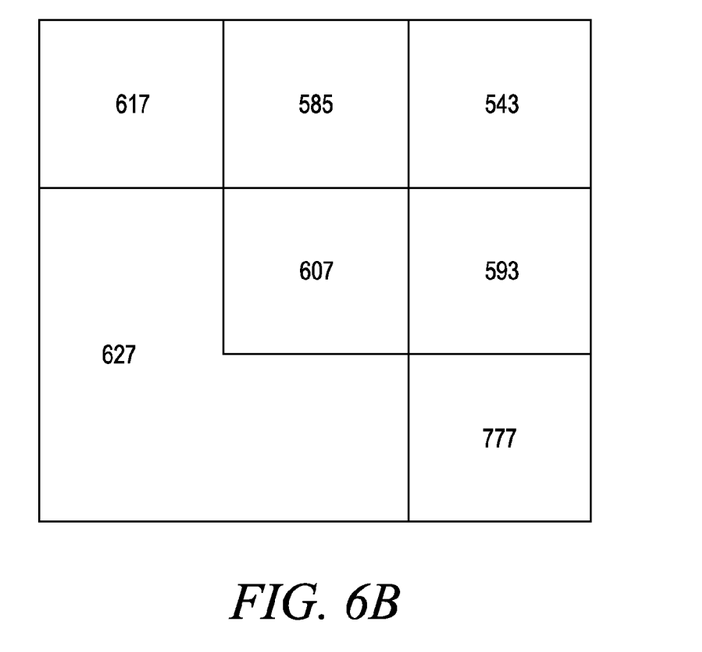

Various techniques may be used to counter recovery of the original background. To illustrate these techniques, FIGS. 6A and 6B depict the transition region 300 of the composite image 200 shown in FIG. 3 using numbers to represent colors. FIG. 6A depicts the foreground in the transition region 300 as color 627. Note that each color may be a vector quantity (e.g., containing three elements for red, green, and blue color channels). The foreground color can, of course, change from pixel to pixel but is represented here as a single color for convenience. The original background color is shown as generally changing slightly from pixel to pixel (each background number being close to an adjacent background number), although neighboring pixels may have a background that changes dramatically as well, as shown in the bottom right corner of FIG. 6A. As noted above, however, only one scalar or vector color is provided by each pixel. The overall color of the pixel, being a combination of the foreground and background colors, thus combines the corresponding foreground and background numbers in proportion to the percentage of foreground and background present in the pixel to arrive at a single color for the pixel. An example of the resulting numbers indicating the colors of the pixels is shown in FIG. 6B. Note that with better determination (using another algorithm) of the shape or percentage of the foreground image in the pixel, e.g., from the percentage or shape in nearest-neighbor pixels, the background color can be better estimated.

Figure 7A:
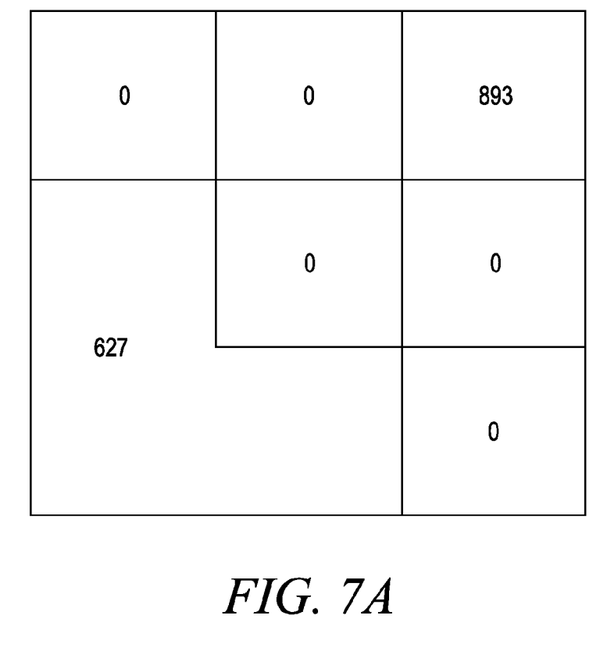
FIGS. 7A and 7B depict a numerical example of colors of the boundary pixels of FIG. 2 after boundary pixel modification in one embodiment.
Figure 7B:
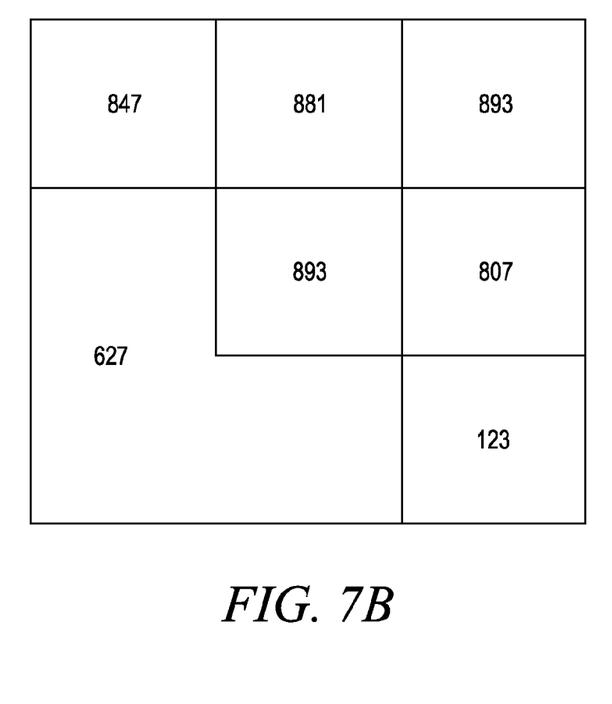

One technique of eliminating the original background information is to simply replace the boundary pixels after the foreground and original background are established and separated with boundary pixels of a given desired color (which may vary around the boundary if desired). As shown in FIG. 7A, the boundary pixel colors are uniformly black (0), although a color between the foreground color (627) and the substitute background color (only one of which—893—is shown for convenience) may be chosen using the color values stored in a local (i.e., device) or remote memory. Alternatively, after the boundary pixels are determined, each boundary pixel color is replaced by one or a combination of colors of substitute background pixels near the boundary pixel, as shown in FIG. 7B. In this case, the substitute background pixels adjacent to the foreground are similar to the outlying adjacent pixels. Alternatively, the technique of FIG. 7B may be used to "shrink" the substitute background around the foreground as outlying substitute background pixels replace substitute background pixels closer to the foreground.

However, elimination of original boundary color information in the boundary pixels in the techniques of FIG. 7A or 7B may cause the foreground subject to be truncated. This detracts from the realism of the image as fine detail such as hair is lost. Further, the foreground subject may be outlined or the substitute background may be distorted.

In another technique for countering the recovery of original background color information, the color of a boundary pixel is replaced by one or a combination of colors of foreground pixels near the boundary pixel.

A technique that yields a more realistic-looking boundary between foreground and background in the composite image replaces a boundary pixel color with a combination of one or more colors of neighboring foreground pixels and one or more colors of neighboring substitute background pixels. The foreground color of the original image boundary pixel is estimated using a weighted average of neighboring foreground pixel colors. The background color of the original image boundary pixel is estimated using a weighted average of neighboring background pixel colors. The original image boundary pixel is modeled as a weighted average of two color components; one is the estimated foreground color of the boundary pixel and the other is the estimated background color of the boundary pixel. The two weights of the weighted average are determined so that the weighted average is as close as possible to the color of the boundary pixel in the original image and so that the weights sum to 1. The determining of the weights determines a percentage of original background in the target boundary pixel. The replacement color for the boundary pixel is determined by substituting another color for the estimated color of the original background in the weighted average. Thus, a desired color may be used as a substitute in proportion. For example, the color that replaces the estimated color of the original background in the weighted average may be the color of the corresponding pixel of the substitute background. The color chosen to replace the original background color may be the same for every boundary pixel or may change depending on the position of the target boundary pixel.

Figure 8A:
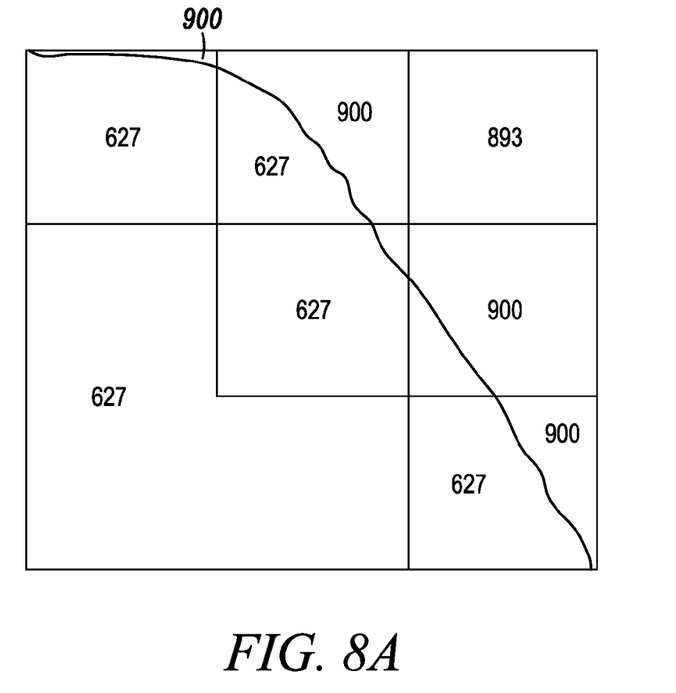
FIGS. 8A and 8B depict a numerical example of colors of the boundary pixels of FIG. 2 after boundary pixel modification in one embodiment.
Figure 8B:
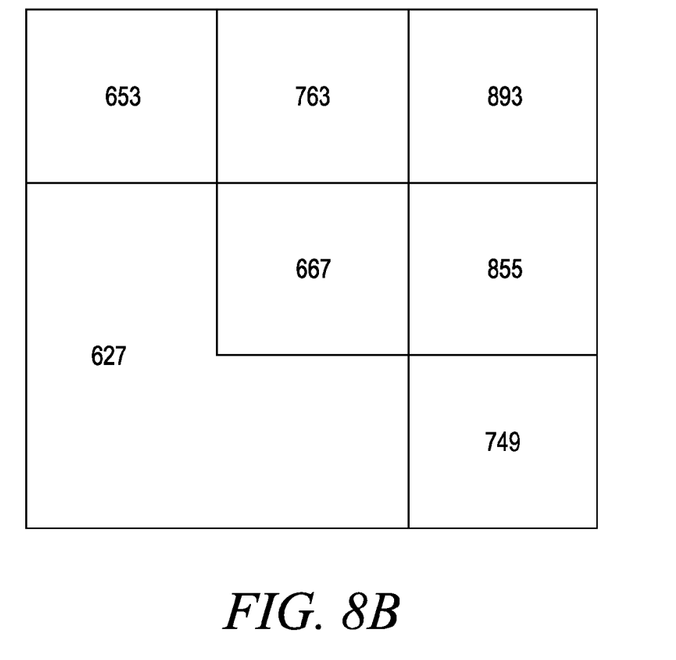

In an example shown in FIG. 8A, a boundary pixel contains a weighted average of an original foreground color 627 and an original background color 900. A replacement background color close to the colors of neighboring substitute background pixels 893 and 855 may be substituted for the color 900 in the weighted average to yield a color 763 in the composite image, shown in FIG. 8B. The resulting color of the target boundary pixel contains a color that depends on the colors of both the foreground and substitute background, thereby keeping information about the original foreground while reducing information about the original background.

Figure 9A:
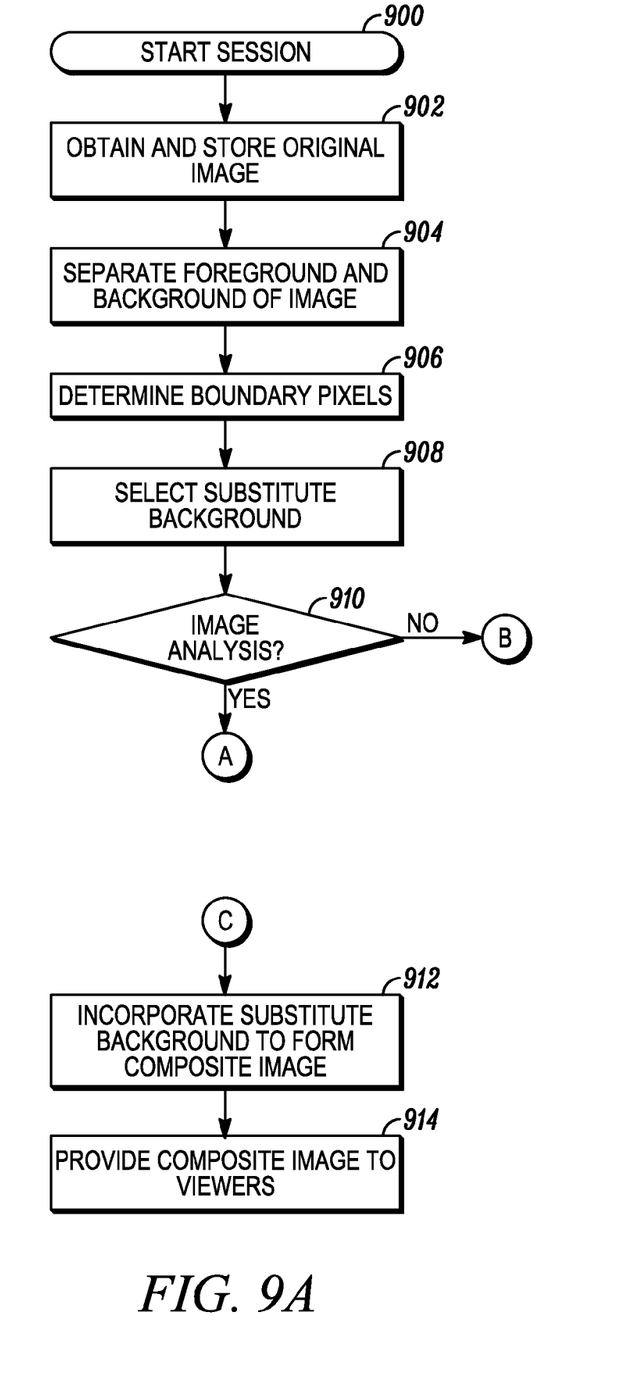
FIGS. 9A and 9B show a flowchart of boundary pixel modification according to one embodiment.
Figure 9B:
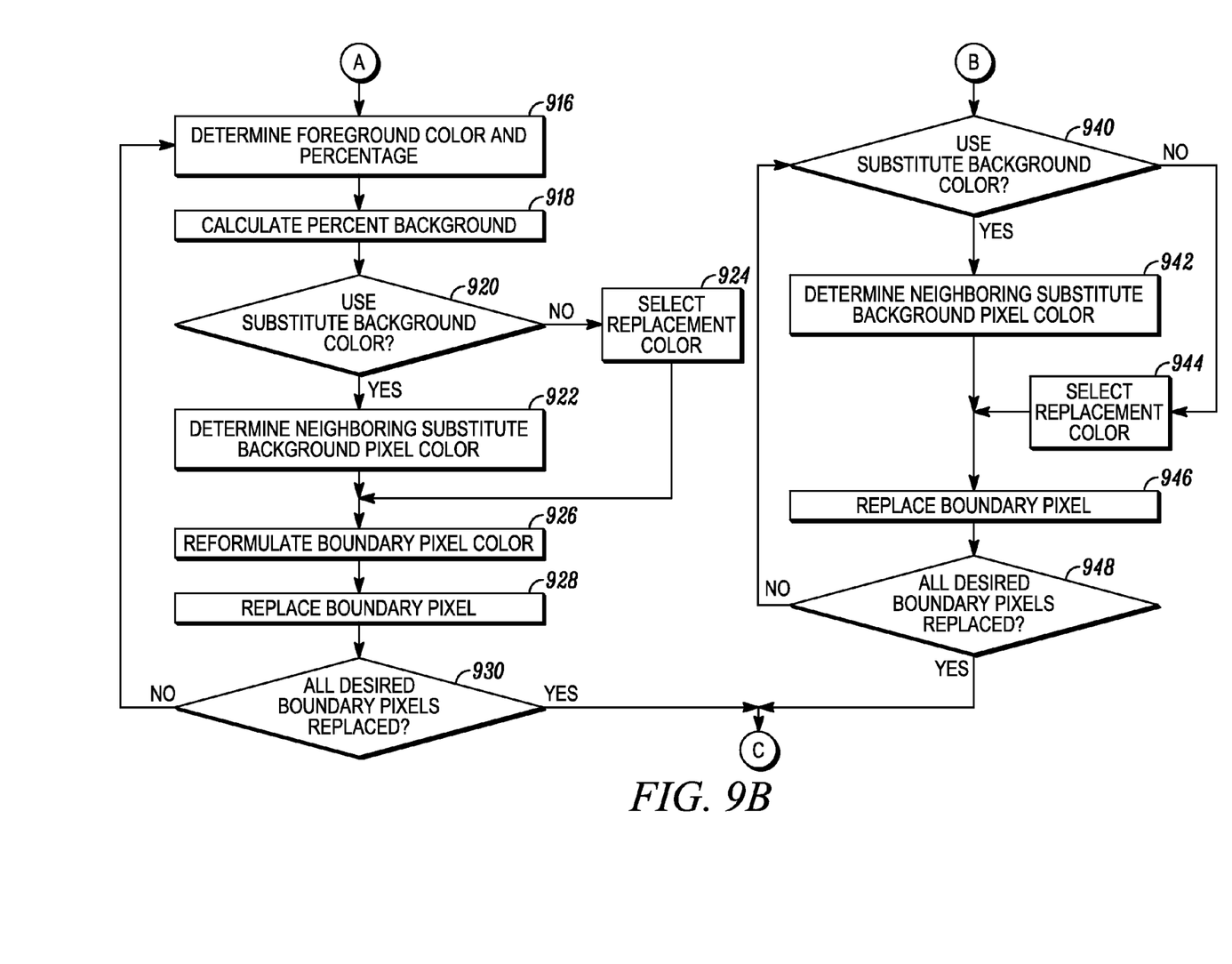

FIGS. 9A and 9B show flowcharts according to one embodiment. At step 900, the communication session starts. The communication session can include videoconferencing with other people or recording a video for storage and later replay, for example. At step 902, an image is captured using one or more cameras on an electronic device, such as a cell phone or laptop. This image is stored in memory either locally on the electronic device or remotely on a different device (or both). The image can be transferred to this other device through a wired or wireless connection or using a removable storage device such as a memory stick or storage disk. In any case, the image is provided to a device containing a processor that modifies the image. Specifically, the processor contains a known algorithm that separates the foreground of the image from the original background of the image at step 904 examples of which were provided above. As above, this algorithm can use depth and/or color information, for example, of the pixels to perform the separation. Once separated, the foreground and background may be stored separately in memory if desired.

The boundary pixels are then determined at step 906, in a manner similar to one of the above techniques. Although shown after separation of the foreground and background at step 904, step 906 can be performed before or concurrently with the separation at step 904. The substitute background is next selected at step 908 although, as before, this can occur at any point in the process prior to being substituted for the original background (even before, e.g., the image is captured or the session has been initiated at step 900). Different avenues may then be taken at step 910 depending on whether the boundary pixel is to be replaced with or without analyzing pixels in the image.

If a more realistic image is desired, further analysis prior to boundary pixel replacement is performed starting at step 916 in FIG. 9B. A target boundary pixel is selected and the color and percentage of the foreground in the target boundary pixel is determined at step 916. For example, the color may be determined as described above. The shape may be determined by fitting curve models, such as spline models, to the boundary to determine subpixel localization of the boundary, for instance. In one embodiment, the information in neighboring foreground pixels, substitute background pixels, and/or other boundary pixels is used to make this determination. In particular, the approximate ratio of foreground to background in the target boundary pixel is determined at step 918, although the precise curvature of the foreground within the target boundary pixel may not be ascertained. The color (and percentage) of foreground is to be retained while the color (and the remaining percentage) of the background in the target boundary pixel is to be replaced by a new color. In step 920, this new color can be related to the color of the substitute background in the vicinity of the target boundary pixel or can be selected as desired. In the former case, the processor executes an algorithm that examines one or more substitute background pixels that are near the target boundary pixel and selects the appropriate color in step 922. In the latter case, the processor merely selects a predetermined color set by the user for replacement of that target boundary pixel that is established after the image is obtained or selects a random color from a set of desired colors in step 924. If a predetermined color is used, the color may be the same along the entire boundary of the foreground (e.g., black) or may change as desired along the boundary. In this case, the boundary color can change depending on one or more characteristics of the target boundary pixel such as the position, the foreground/background ratio, the color of the foreground, and/or one or more characteristics of the neighboring pixels such as their positions, foreground/background ratio if any, or colors. If a random color is used, the processor can randomly select the color using any known technique for randomization selection.

The color of the target boundary pixel is then reformulated at step 926 using the color and percentage of foreground stored in memory and the color and remaining percentage of new color determined above. The original target boundary pixel is then replaced by the reformulated target boundary pixel at step 928. If the entire boundary of the foreground (i.e., all of the target boundary pixels) has not been replaced—or at least a desired subset of the boundary pixels, a new target boundary pixel is selected at step 930 and the process repeats from determining the color and percentage at step 916.

If less computation is desired, the target boundary pixel is selected and a replacement color is substituted without performing further analysis (i.e., no analysis of the proportion of original background color to foreground color and substituting only that proportion—the replacement color is independent of any color components in the boundary pixel). In step 940, the replacement color can be related to the color of the substitute background in the vicinity of the target boundary pixel or can be selected as desired. In the former case, the processor executes an algorithm that examines one or more substitute background pixels that are near the target boundary pixel and selects the appropriate color in the same manner as above in step 942. In the latter case, the processor merely selects a predetermined color that is established prior to the image being analyzed or selects a random color from a set of desired colors in step 944. This selected color in the latter case may change as desired along the boundary of the foreground. The original target boundary pixel is then replaced at step 946. If the entire boundary of the foreground (i.e., all of the target boundary pixels) has not been replaced—or at least the desired subset of the boundary pixels, a new target boundary pixel is selected at step 948 and the process repeats from determining the new color at step 940.

Whether or not further analysis is performed, once the entire boundary of the foreground has been modified (i.e., all of the desired target pixels have been replaced) or at least a substantial portion thereof, the selected substitute background is combined with the foreground containing the modified boundary pixels to form a composite image at step 912. This composite image is then stored in memory and provided to viewers (including the subject in the foreground if desired) at step 914. The composite image can be buffered either locally on the device or remotely to provide real-time communications or can be stored for later use. It will be understood by those skilled in the art that the order of steps may be changed without departing from the spirit of the invention. For example, the selected substitute background may be combined with the foreground prior to the modification of the boundary pixels.

Note that the device and processor performing the image capture may be different from the device performing the processing, the device being used to communicate, and/or the device storing the image or background. These devices can be local or remote to each other and be present in a system. In addition, although not described above, it is clear that the foreground of the image can be altered separately using known algorithms either before or after the background substitution. Moreover, if power or processing capability, for example, becomes problematic during modification of the boundary pixels, the manner in which the modification is effected may be changed (e.g., from analysis to mere replacement by a predetermined color) or may be terminated altogether if, for example, a sufficient percentage of the boundary pixels have already been modified. This percentage can be a predetermined percentage of the total number of boundary pixels (e.g., 90-99%) or can depend on the movement of the foreground. Similarly, the boundary pixel replacement may occur in all of the images in a video or in only some of the images.

In an additional embodiment, rather than using the substitute background or a predetermined color to substitute for the original background, an algorithm may be used to encrypt a secondary image in these boundary pixels. To execute this, the algorithm takes the portion of the secondary image at the boundary pixels and encodes the colors of that portion of the secondary image into the boundary pixels in a manner similar to the encoding of the substitute background pixels into the boundary pixels above. Assuming the foreground subject (say a user) moves over the entire frame of the secondary image over the course of the video created by isolated images containing the secondary image, the information contained in the secondary image is encoded in the video. As the size of the secondary image may differ from the size of the captured image containing the foreground and original background, movement of the foreground subject may cover less area than the frame of the captured image to be able to reconstruct the secondary image. Once transmitted or otherwise transferred, a recovery algorithm similar to that described above may be used by a processor to extract the information of the secondary image contained in the boundary pixels of the video and thus re-form the secondary image.

It will be understood that terms such as "neighboring pixel" may refer either to pixels that are adjacent (i.e., share a side or corner) or nearby but non-adjacent.

Of course, in addition to the above methods of modifying the image to eliminate the original background color in the boundary pixels, the original background color can be extracted from an unmodified image. To extract the original background color from a boundary pixel, a number of the above techniques may be used separately or in combination. For example, the color(s) of one or more neighboring foreground pixels can be used to determine the foreground color (s) of the boundary pixel, the possible background colors in the boundary pixel may be constrained to lie within a subregion of color space based on the foreground color in the boundary pixel and/or a color of the boundary pixel, and/or possible original background colors in the target boundary pixel can be scored according to how likely the possible background colors are to be the original background color. At least one of the foreground color, the constraints, or the scores of the target boundary pixel may be combined with at least one of the foreground color, the constraints, or the scores from another boundary pixel to extract the original background color in the boundary pixel. The other boundary pixel can be a boundary pixel in the same image or in a different image (e.g., another image in a video containing both images).

It will be understood that the terms and expressions used herein have their ordinary meaning as is accorded to such terms and expressions with respect to their corresponding respective areas of inquiry and study except where specific meanings otherwise have been set forth herein. Relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Unless otherwise specifically indicated, the use of a single element in this disclosure does not preclude the existence of additional identical elements in the process, method, article, or apparatus that comprises the element. For example, the use of the term "a" in the claims is intended to encompass one or more of the terms that succeed it.

The Abstract of this disclosure is provided to comply with 37 C.F.R. §1.72(b), which requires an abstract that will enable a reader to quickly ascertain the nature of the technical disclosure. It is submitted with the understanding that it will not be used to interpret or limit the scope or meaning of the claims. In addition, it can be seen in the foregoing Detailed Description that various features are grouped together in a single embodiment, for the purpose of streamlining the disclosure. This method of disclosure should not be interpreted as reflecting an intention that the claimed embodiments require more features than are expressly recited in each claim. On the contrary, as the following claims reflect, the inventive subject matter lies in less than all the features of a single disclosed embodiment. Thus, the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made and all equivalents of those claims as issued.

The invention claimed is:

1. A method of modifying an image containing a foreground, an original or substitute background, and boundary pixels on a boundary between the foreground and the original or substitute background, the method comprising:
    determining a target boundary pixel of the boundary pixels;
    selecting a replacement color for the target boundary pixel independent of the color of the original background in the target boundary pixel, the replacement color selected based on at least one of: a color of at least one of a neighboring foreground pixel, a neighboring substitute or original background pixel, the target boundary pixel, another boundary pixel, a predetermined replacement color, or a color selected at random from a set of replacement colors;
    establishing the color of a modified target boundary pixel based on the selected replacement color; and
    replacing the color of the target boundary pixel with the color of the modified target boundary pixel.

2. The method of claim 1, further comprising repeating the determining, selecting, establishing, and replacing until at least a sufficient percentage of the boundary pixels is replaced with modified boundary pixels.

3. The method of claim 2, the selecting comprising selecting the predetermined replacement color and changing the predetermined replacement color along a boundary of the foreground depending on a characteristic of the target boundary pixel or a characteristic of a neighbor pixel of the target boundary pixel.

4. The method of claim 2, wherein a substitute background is provided and the selecting comprises selecting the replacement color depending on the color of the substitute background in the neighboring substitute background pixel for each modified boundary pixel.

5. The method of claim 2, the selecting comprising selecting the predetermined replacement color and maintaining a single replacement color around the boundary.

6. The method of claim 1, further comprising:
    (a) repeating the determining, selecting, establishing, and replacing until at least a sufficient percentage of the boundary pixels is replaced with modified boundary pixels; and
    (b) repeating (a) for each image of a plurality of images in a video.

7. The method of claim 1, wherein the color of the target boundary pixel has components of both the foreground and the original background colors,
    the selecting comprising:
        determining the colors of the original background and the foreground in the target boundary pixel; and
        determining a ratio of original background to foreground in the target boundary pixel, and
    the establishing comprising reformulating the color of the target boundary pixel based on the color of the foreground of the target boundary pixel and the percentage of original background in the target boundary pixel, the color of the original background in the target boundary pixel being replaced by the selected replacement color in proportion to the percentage of the original background in the target boundary pixel to provide the color of the modified target boundary pixel.

8. The method of claim 7, further comprising repeating the determining, selecting, establishing, and replacing until at least a sufficient percentage of the boundary pixels is replaced with modified boundary pixels.

9. The method of claim 8, the selecting comprising selecting the predetermined replacement color and changing the predetermined replacement color along a boundary of the foreground depending on a characteristic of the target boundary pixel or a characteristic of a neighbor pixel of the target boundary pixel.

10. The method of claim 8, wherein a substitute background is provided and the selecting comprises selecting the replacement color depending on the color of the substitute background in the neighboring substitute background pixel for each modified boundary pixel.

11. The method of claim 1, wherein, of the foreground and the original background colors, the color of the target boundary pixel has a component only of the original background color.

12. The method of claim 1, wherein the replacement color is independent of any color components in the target boundary pixel.

13. A method of preventing recovery of an original background from boundary pixels in an image containing a foreground, a substitute background different from the original background of the image, and boundary pixels on a boundary between the foreground and the substitute background and that contain a color component of the original background, the method comprising:
    selecting a target boundary pixel of the boundary pixels; and
    preventing the original background color of the target boundary pixel from being extracted from the target boundary pixel by recoloring the target boundary pixel.

14. The method of claim 13, further comprising (a) repeating the selecting and preventing until at least a sufficient percentage of the boundary pixels is replaced with recolored boundary pixels.

15. The method of claim 14, further comprising (b) repeating (a) for each image of a plurality of images in a video.

16. The method of claim 13, wherein the target boundary pixel is recolored such that the color of the recolored target boundary pixel is independent of any color components in the target boundary pixel.

17. The method of claim 13, wherein the color of the target boundary pixel has components of both the foreground and the original background colors, the preventing comprising:
    determining the colors of the original background and the foreground in the target boundary pixel;
    determining a ratio of original background to foreground in the target boundary pixel; and
    recoloring the target boundary pixel based on the color of the foreground of the target boundary pixel and the percentage of the original background in the target boundary pixel such that the color of the original background in the target boundary pixel is replaced in the recolored target boundary pixel in proportion to the percentage of the original background in the target boundary pixel.

18. A device comprising a processor that modifies an image containing a foreground, a substitute background, and, in boundary pixels, an original background, the processor:
    determining at least some of the boundary pixels;

selecting a replacement color independent of the color of the original background for a target boundary pixel of the at least some of the boundary pixels, the replacement color being selected based on at least one of: neighboring foreground pixels, substitute background pixels, other boundary pixels, a predetermined replacement color, or a color selected at random from a set of replacement colors;

establishing the color of a modified target boundary pixel based on the selected replacement color;

replacing the target boundary pixel with the modified target boundary pixel; and repeating the determining, selecting, establishing, and replacing until at least a sufficient percentage of the boundary pixels is replaced with modified boundary pixels.

19. The device of claim 18, the processor selecting the predetermined replacement color as the replacement color and changing the predetermined replacement color along a boundary of the foreground depending on a characteristic of the target boundary pixel or a characteristic of a neighboring pixel of the target boundary pixel.

20. The device of claim 19, the processor selecting the predetermined replacement color depending on the color of the substitute background in the neighboring substitute background pixel.

21. The device of claim 18,
the selecting comprising:
determining the color of the original background and of the foreground of the target boundary pixel; and
determining a ratio of original background to foreground in the target boundary pixel, and
the establishing comprising reformulating the color of the target boundary pixel based on the color of the foreground of the target boundary pixel and the percentage of original background in the target boundary pixel, the original background in the target boundary pixel being replaced by the selected color to provide the color of the modified target boundary pixel.

* * * * *